US011212452B2

(12) United States Patent
Kimura

(10) Patent No.: US 11,212,452 B2
(45) Date of Patent: Dec. 28, 2021

(54) CONTROL APPARATUS, CONTROL METHOD, AND STORAGE MEDIUM

(71) Applicant: CANON KABUSHIKI KAISHA, Tokyo (JP)

(72) Inventor: Hiroaki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/091,024

(22) Filed: Nov. 6, 2020

(65) Prior Publication Data
US 2021/0144307 A1 May 13, 2021

(30) Foreign Application Priority Data

Nov. 12, 2019 (JP) .............................. JP2019-204902

(51) Int. Cl.
H04N 5/232 (2006.01)

(52) U.S. Cl.
CPC ..... H04N 5/23299 (2018.08); H04N 5/23212 (2013.01); H04N 5/23296 (2013.01)

(58) Field of Classification Search
CPC ........... H04N 5/23299; H04N 5/23212; H04N 5/23296; H04N 9/0451; H04N 9/0455; G02B 7/34; G02B 7/38; G02B 7/36; G02B 7/09; G02B 7/105; G02B 7/102
See application file for complete search history.

(56) References Cited

U.S. PATENT DOCUMENTS

| 2006/0290854 | A1* | 12/2006 | Hisatake | G02F 1/133634 349/117 |
| 2007/0071429 | A1* | 3/2007 | Woehler | H04N 5/2259 396/89 |
| 2017/0155847 | A1* | 6/2017 | Ito | G03B 21/147 |
| 2017/0180618 | A1 | 6/2017 | Georgiev et al. | |
| 2017/0192247 | A1 | 7/2017 | Okuda | |
| 2017/0272657 | A1* | 9/2017 | Ito | G03B 5/00 |
| 2017/0272658 | A1 | 9/2017 | Ito | |

(Continued)

FOREIGN PATENT DOCUMENTS

| EP | 3684046 A1 | 7/2020 |
| JP | 2001-116980 A | 4/2001 |
| JP | 2003-75716 A | 3/2003 |

OTHER PUBLICATIONS

Extended European Search Report issued by the European Patent Office dated May 7, 2021 in corresponding EP Patent Application No. 20206597.5.

*Primary Examiner* — Shahbaz Nazrul
(74) *Attorney, Agent, or Firm* — Carter, DeLuca & Farrell LLP

(57) ABSTRACT

A control apparatus includes an acquisition unit configured to acquire optical information, a tilt control unit configured to tilt an image sensor relative to a plane orthogonal to an optical axis of an imaging optical system, and a calculation unit configured to calculate an image shift amount by a phase difference detection method based on a signal from the image sensor and to calculate a defocus amount based on the image shift amount and a conversion coefficient. The calculation unit changes at least one of a correction amount of the signal and the conversion coefficient based on the optical information and a tilt angle that is an angle formed by the image sensor and the plane.

17 Claims, 9 Drawing Sheets

(56) References Cited

U.S. PATENT DOCUMENTS

| | | | |
|---|---|---|---|
| 2019/0075284 A1* | 3/2019 | Ono | G03B 35/08 |
| 2019/0349532 A1* | 11/2019 | Niga | H04N 5/232061 |
| 2020/0128162 A1* | 4/2020 | Takami | H04N 5/23212 |
| 2020/0137313 A1* | 4/2020 | Sato | H04N 5/232123 |
| 2020/0177817 A1* | 6/2020 | Osawa | H04N 5/2259 |
| 2020/0191563 A1* | 6/2020 | Sato | G03B 13/30 |
| 2020/0213523 A1* | 7/2020 | Niga | H04N 5/232945 |
| 2020/0236290 A1* | 7/2020 | Kawasaki | G03B 3/10 |
| 2020/0275032 A1* | 8/2020 | Kimura | H04N 5/2353 |
| 2020/0296296 A1* | 9/2020 | Chino | H04N 5/23299 |
| 2021/0067702 A1* | 3/2021 | Sato | H04N 5/23299 |
| 2021/0092302 A1* | 3/2021 | Kawasaki | H04N 5/232123 |
| 2021/0144307 A1* | 5/2021 | Kimura | G02B 7/38 |

* cited by examiner

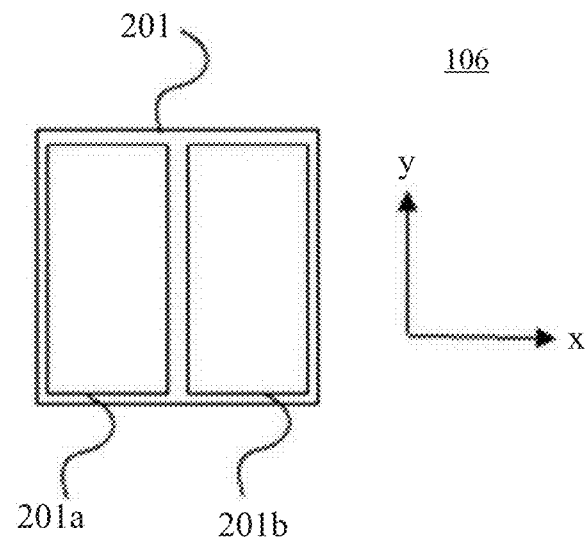
FIG. 2
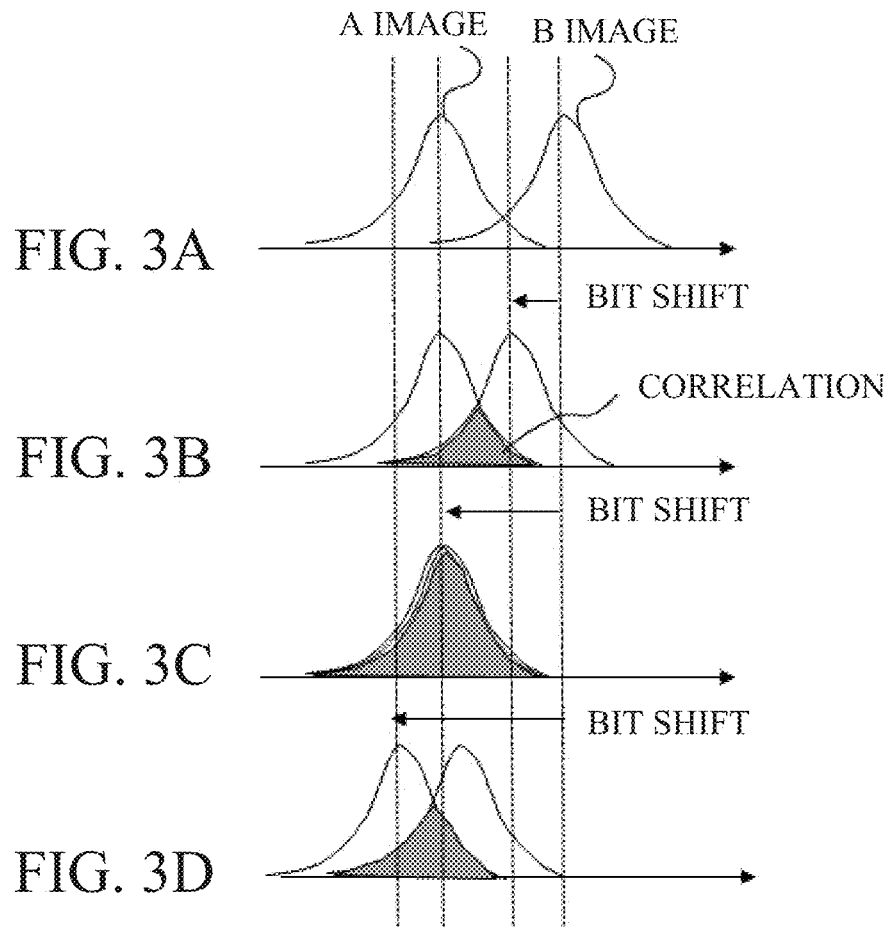
FIG. 3A
FIG. 3B
FIG. 3C
FIG. 3D

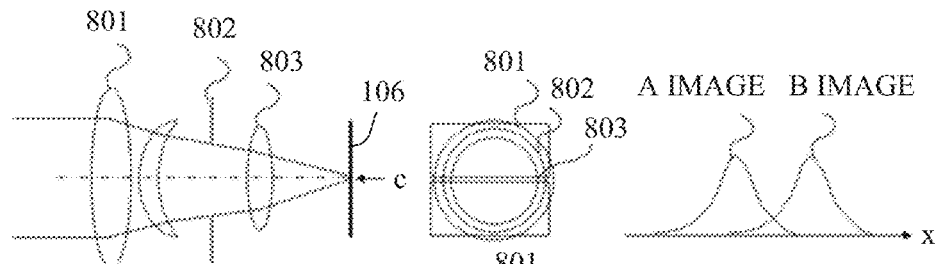
FIG. 8A
FIG. 8B
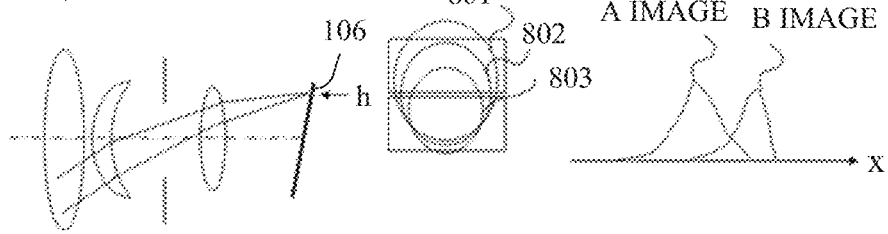
FIG. 9A
FIG. 9B

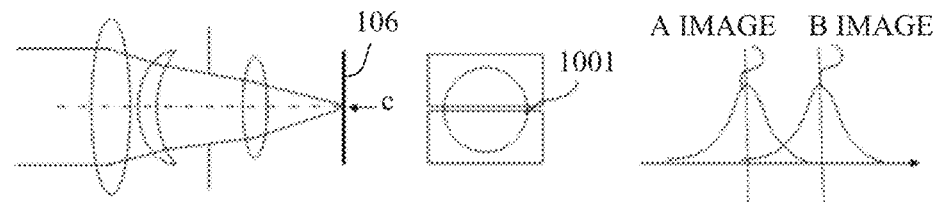
FIG. 10A
FIG. 10B
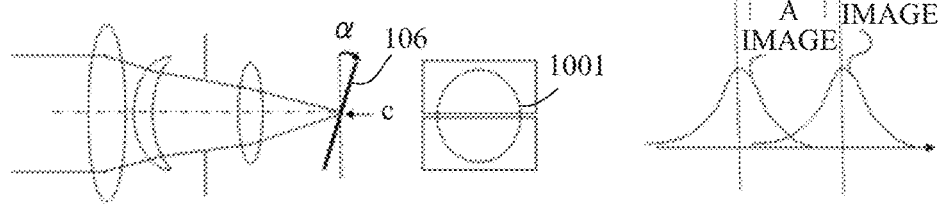
|  |  | IMAGE HEIGHT | | |
|---|---|---|---|---|
|  |  | i0 | c0 | h0 |
| FOCUS POSITION | Far | a | b | c |
|  | Near | d | e | f |
FIG. 11A
|  |  | TILT ANGLE | | |
|---|---|---|---|---|
|  |  | 0° | 5° | 10° |
| (a) | a | 0.98 | 0.97 | 0.96 |
|  | b | 1.00 | 0.99 | 0.98 |
|  | c | 0.98 | 0.98 | 0.97 |
|  | d | 0.98 | 0.97 | 0.95 |
|  | e | 1.01 | 1.00 | 0.98 |
|  | f | 0.98 | 0.97 | 0.96 |
FIG. 11B

CONTROL APPARATUS, CONTROL METHOD, AND STORAGE MEDIUM

BACKGROUND OF THE INVENTION

Field of the Invention

The present invention relates to a control apparatus that provides a focus control and a tilt control.

Description of the Related Art

The technology called the Scheimpflug principle has conventionally been known which extends a depth of field by relatively tilting a lens and an image sensor. Japanese Patent Laid-Open No. ("JP") 2003-75716 discloses a method for executing, for each object, processing that controls a focus position so as to maximize a contrast evaluation value, and for determining the focus position and a tilt control amount so as to focus on a plurality of objects, JP 2001-116980 discloses a method for driving the focus position from one end to the other end and for storing a focus position so as to maximize a contrast evaluation value for each object.

However, the methods disclosed in JPs 2003-75716 and 2001-116980 provide a focus control using a contrast AF, and thus need a relatively long time. In addition, they actually move the focus lens and the image sensor to calculate the tilt angle and the focus position, and thus the unnecessary operation deteriorates the quality.

As a solution for these problems, a focus control method using a phase difference AF is conceivable. However, the phase difference AF with the image sensor tilted may cause hunting and a high-speed and highly accurate focus control may become difficult.

SUMMARY OF THE INVENTION

The present invention provides a control apparatus, a control method, and a storage medium, each of which can provide a high-speed and highly accurate focus control even when an imaging plane is tilted.

A control apparatus according to one aspect of the present invention includes an acquisition unit configured to acquire optical information, a tilt control unit configured to tilt an image sensor relative to a plane orthogonal to an optical axis of an imaging optical system, and a calculation unit configured to calculate an image shift amount by a phase difference detection method based on a signal from the image sensor and to calculate a defocus amount based on the image shift amount and a conversion coefficient. The calculation unit changes at least one of a correction amount of the signal and the conversion coefficient based on the optical information and a tilt angle that is an angle formed by the image sensor and the plane. At least one processor or circuit is configured to perform a function of at least one of the units.

A control method according to another aspect of the present invention includes the steps of acquiring optical information, tilting an image sensor relative to a plane orthogonal to an optical axis of an imaging optical system, and calculating an image shift amount by a phase difference detection method based on a signal from the image sensor and to calculate a defocus amount based on the image shift amount and a conversion coefficient. The calculation step changes at least one of a correction amount of the signal and the conversion coefficient based on the optical information and a tilt angle that is an angle formed by the image sensor and the plane.

A non-transitory computer-readable storage medium storing a program for causing a computer to execute the above control method or the program also constitutes another aspect of the present invention.

Further features of the present invention will become apparent from the following description of exemplary embodiments with reference to the attached drawings.

BRIEF DESCRIPTION OF THE DRAWINGS

FIG. 2 is a pixel configuration diagram of an image sensor in each embodiment.

FIGS. 3A to 3D explain a calculation of a bit shift amount in each embodiment.

FIGS. 8A and 8B explain a shading correction in each embodiment.

FIGS. 9A and 9B are data tables relating to the shading correction coefficients in each embodiment.

FIG. 10A and FIG. 10B explain a correction of a conversion coefficient in each embodiment, FIG. 11A and FIG. 11B are data tables relating on a conversion coefficient in each embodiment.

DESCRIPTION OF THE EMBODIMENTS

Referring now to the accompanying drawings, a description will be given of embodiments according to the present invention.

Overall Configuration

Figure 1:
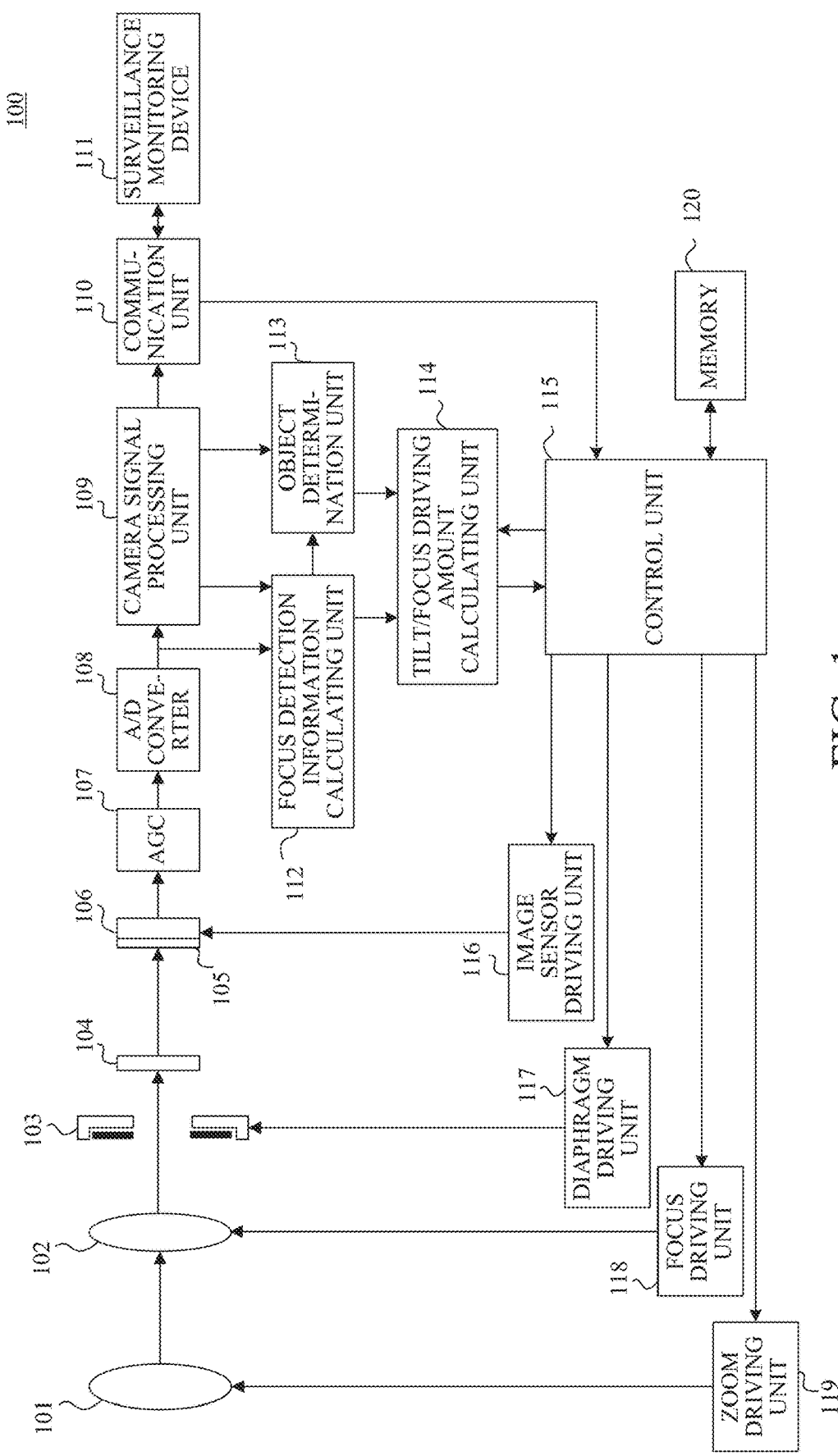
FIG. 1 is a block diagram of an image pickup apparatus in each embodiment.

Referring now to FIG. 1, a description will be given of an image pickup apparatus according to this embodiment. FIG. 1 is a block diagram of an image pickup apparatus (control apparatus) 100. A zoom lens 101 moves in an optical axis direction and changes a focal length. A focus lens 102 moves in the optical axis direction and provides a focus control. A diaphragm (aperture stop) unit 103 adjusts a light amount. In this embodiment, the zoom lens 101, the focus lens 102, and the diaphragm unit 103 form an imaging optical system.

Light that has passed through the imaging optical system is received by an image sensor 106 via a bandpass filter (BPF) 104 and a color filter 105. The bandpass filter 104 may be inserted into and retreated from the optical path of the imaging optical system. The image sensor 106 has a CMOS sensor and the like, and photoelectrically converts an optical image (object image) formed through the imaging optical system. An AGC 107 controls a gain for an analog electric signal (imaging signal) output from the image sensor 106. An A/D converter 108 converts an analog electric signal into a digital signal (digital imaging signal). A camera signal processing unit 109 performs various kinds of image processing for the digital imaging signal to generate a video signal. The video signal is output to a surveillance monitoring device 111 connected to the image pickup apparatus 100 by a wire or wireless communication via the communication unit 110. In addition, the communication unit 110 receives a command from an external device and outputs a control signal such as a command to the control unit (tilt/focus control unit) 115 of the image pickup apparatus 100.

A focus detection information calculating unit (calculation unit) 112 receives an RGB pixel value or luminance value from the camera signal processing unit 109 for each target object area, and acquires phase-difference distance information. An object determination unit 113 receives a result from the camera signal processing unit 109 and detects an object in an imaging screen. The object determination unit 113 can also determine an object designated by the user or set in advance, such as a person or a car.

A tilt/focus driving amount calculating unit (driving amount control unit) 114 acquires focus detection information from the focus detection information calculating unit 112 and object information from the object determination unit 113. The tilt/focus driving amount calculating unit 114 calculates an appropriate (optimum) tilt angle and focus position according to the scene, based on the focus detection information and the object information, and the tilt angle and the focus position from the control unit 115.

The control unit 115 controls the tilt angle and the focus position based on the tilt angle and the focus position calculated by the tilt/focus driving amount calculating unit 114. The control unit 115 performs a focus control in autofocus (AF) or manual focus (MF), a zoom control, and a diaphragm control according to an instruction from the communication unit 110. The control unit 115 receives the current positions from an image sensor driving unit 116, a diaphragm driving unit 117, a focus driving unit 118, and a zoom driving unit 119, and outputs the current positions to the tilt/focus driving amount calculating unit 114. The control unit 115 instructs the tilt angle and the focus position calculated by the tilt/focus driving amount calculating unit 114 to the image sensor driving unit (tilt control unit) 116 and the focus driving unit (focus control unit) 118, respectively.

The image sensor driving unit 116 tilts the image sensor 106 and controls the tilt angle based on the tilt angle instructed by the control unit 115. Normally, a rotating axis used to tilt the image sensor 106 is located at the center of the imaging screen, and the image sensor 106 tilts around the rotating axis, but the present invention is not limited to this example. The diaphragm driving unit 117 controls the position of the diaphragm unit 103 based on a setting value of the diaphragm transmitted from the control unit 115. The focus driving unit 118 controls the position of the focus lens 102 (performs a focus control) based on the focus setting position instructed by the control unit 115 (based on the defocus amount). The zoom driving unit 119 controls the position of the zoom lens 101 based on the zoom setting value transmitted from the control unit 115.

The focus detection information calculating unit 112 uses the focus detection data obtained by the camera signal processing unit 109 and performs focus detection information calculating processing by the phase difference detection method. More specifically, the camera signal processing unit 109 generates, as focus detection data, a pair of image data formed by light fluxes passing through a pair of pupil aeras of the imaging optical system, and the focus detection information calculating unit 112 detects a defocus amount based on the shift amount of the pair of image data. Thus, the focus detection information calculating unit 112 performs a focus detection by the imaging-plane phase difference detection method based on the output of the image sensor 106 without using a dedicated AF sensor. A detailed description will be given later of the focus detection information calculating operation of the focus detection information calculating unit 112 by the imaging-plane phase difference detection method. The focus detection information calculating unit 112 may acquire an evaluation value (contrast evaluation value) relating to the contrast of the specific frequency, and calculate the defocus amount based on a difference between the original focus position and the focus position that provides a peak contrast evaluation value.

A memory (storage unit) 120 stores data relating to a program executed by the control unit 115, and data relating to a shading correction coefficient and data relating to a conversion coefficient described later.

Focus Detection Information Calculating Operation by Image-Plane Phase Difference Detection Method Referring now to FIG. 2, a description will be given of a pixel configuration of the image sensor 106. FIG. 2 is a pixel configuration diagram of the image sensor 106. In the image sensor 106, each of all pixels 201 is divided into two photoelectric conversion units 201a and 201b in the X direction. In the image sensor 106, the photoelectric conversion signal of each photoelectric conversion unit (one of the photoelectric conversion unit 201a and 201b) and the sum of the photoelectric conversion signals of the two photoelectric conversion units 201a and 201b are independently readable. By subtracting the photoelectric conversion signal of one photoelectric conversion unit (the photoelectric conversion unit 201a or 201b) from the sum of the photoelectric conversion signals of the two photoelectric conversion units 201a and 201b, a signal corresponding to the photoelectric conversion signal of the other photoelectric conversion unit can be obtained. The photoelectric conversion signal in each photoelectric conversion unit is used as focus detection data for the phase difference AF. The sum of the two photoelectric conversion signals is used as normal captured image data.

A relative image shift amount between the signal (A image) corresponding to the photoelectric conversion signal of the photoelectric conversion unit 201a and the signal (B image) corresponding to the photoelectric conversion signal of the photoelectric conversion unit 201b generated in this way is calculated by a correlation calculation. Thereby, a hit shift amount [bit] can be calculated, which is the correlation degree between the pair of image signals. By multiplying the bit shift amount by the conversion coefficient, it can be converted into a defocus amount [mm] in the predetermined area.

This embodiment assumes that the output signals of one photoelectric conversion unit and the sum of the output signals of all photoelectric conversion units from each pixel 201 are read out of the image sensor 106. For example, when the output signal of the photoelectric conversion unit 201a and the sum of the output signals of the photoelectric conversion units 201a and 201b are read out, the output signal of the photoelectric conversion unit 201b can be obtained by subtracting the output of the photoelectric conversion unit 201a from the sum of the output signals of the photoelectric conversion units 201a and 201b. Thereby, both the A image and the B image can be obtained, and the focus detection by the imaging-plane phase difference detection method can be realized. The sum of the output signals of the photoelectric conversion units 201a and 201b generally forms one pixel (output pixel) of the output image. Since this image sensor is well-known, a detailed description thereof will be omitted.

Next follows a description of the focus detection information calculating operation by the imaging-plane phase difference detection method. The following focus detection information calculating operation is executed mainly by the focus detection information calculating unit 112.

First, the focus detection information calculating unit 112 sets the focus detection position. Next, the focus detection information calculating unit 112 reads out the focus detection data. The respective signals of the A image and the B image can be generated by using the signals read out of the pixels in the focus detection position set by the focus detection information calculating unit 112. Next, the focus detection information calculating unit 112 calculates a bit shift amount P [bit] by calculating the relative image shift amount between the A image and the B image by the correlation calculation.

Referring now to FIGS. 3A to 3D, a description will be given of an example of a correlation calculation method. FIGS. 3A to 3D are explanatory diagrams of the correlation calculating method (calculation of bit shift amount). In FIGS. 3A to 3D, the ordinate axis represents a signal value and the abscissa axis represents a bit (position). It is assumed that the signals of the A image and the B image are read out of the pixels (focus detection pixels) of the image sensor 106. The camera signal processing unit 109 first performs digital filtering processing for each of the A image and the B image in order to reduce noises. FIG. 3A illustrates a filtered waveform.

As illustrated in FIGS. 3A to 3D, the focus detection information calculating unit 112 bit-shifts one or both of the A image signal and the B image signal and calculates a correlation amount COR at that time. The correlation amount COR at this time is, but not limited to, an area when the A image and the B image overlap each other, a value obtained by subtracting the area of the B image from the area of the A image, or a calculated value representing the correlation degree. A description will now be given of a case where the correlation amount COR is the area when the A image and the B image overlap each other. When the A image and the B image coincide with each other, the overlap between the A image and the B image becomes large and thus provides the highest correlation and the large correlation amount COR. Here, the shift amount [bit] when the correlation amount COR has the maximum value becomes the bit shift amount P [bit].

Figure 4:
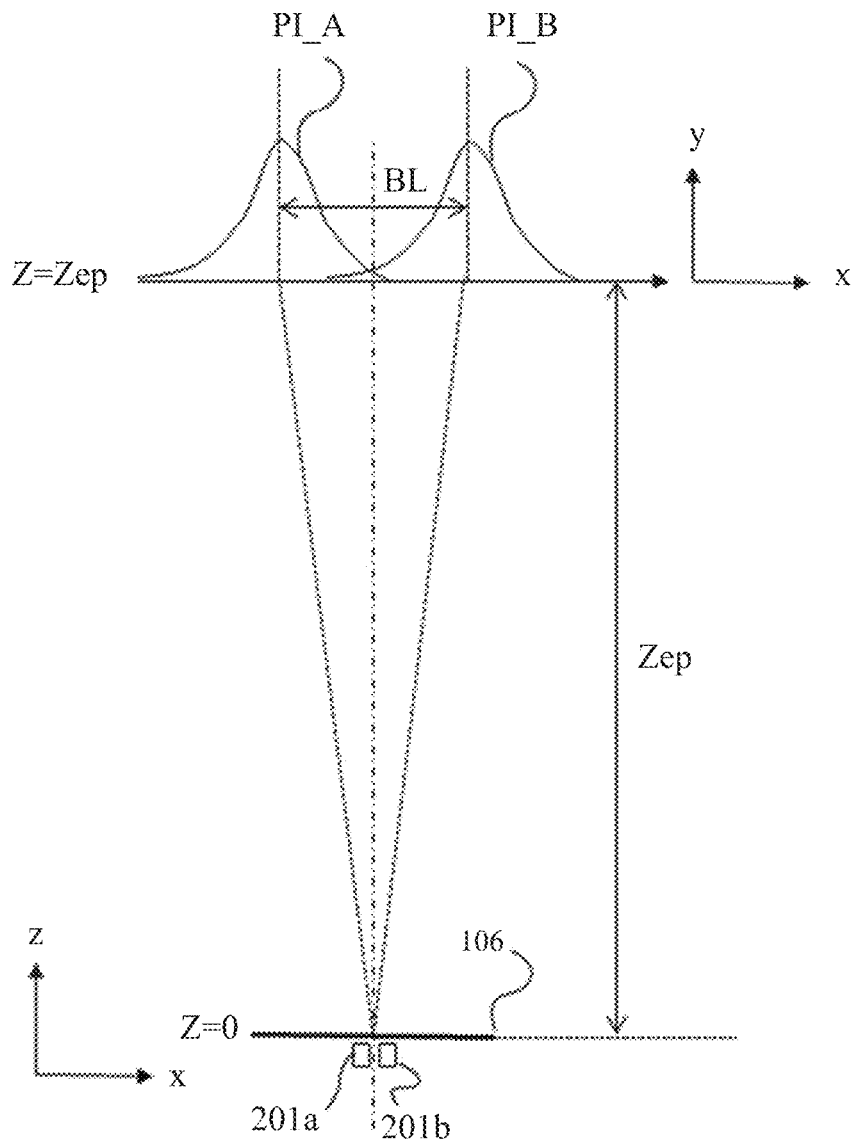
FIG. 4 explains a calculation of a conversion coefficient in each embodiment.

Next, a conversion coefficient K is obtained as a value by which the bit shift amount P is multiplied so as to calculate the defocus amount DEF. Referring now to FIG. 4, a description will be given of a calculation of the conversion coefficient K. FIG. 4 explains the calculation of the conversion coefficient K. In FIG. 4, the Z direction axis represents the optical axis direction of the imaging optical system, and Z=0 represents the (imaging) plane of the image sensor 106. Zep represents an exit pupil distance. A pupil intensity distribution PI_A and a pupil intensity distribution PI_B, which are the light intensity distributions of the focus detection light fluxes of the A image and the B image on Z=Zep, are projected images projected on the exit pupil plane, of the signals (focus detection signals) output from the respective photoelectric conversion units 201a and 201b.

PI_A and PI_B in FIG. 4 indicate a one-dimensional pupil intensity distribution. A distance between the centers of gravity of the pupil intensity distributions PI_A and PI_B is set as a baseline length BL. At this time, a change amount [mm] in the optical axis direction relative to the bit shift amount P [bit] between the A image and the B image can be calculated by a ratio of the exit pupil distance Zep and the baseline length BL. Thus, the conversion coefficient K can be expressed by the following expression (1).

$$K = Zep/BL \quad (1)$$

Next, the focus detection information calculating unit 112 calculates the defocus amount DEF [mm] by the following expression (2).

$$DEF = P \times K \quad (2)$$

In focusing on the focus detection position, the tilt/focus driving amount calculating unit 114 calculates a driving amount M [lensmm] of the focus lens 102 based on the defocus amount DEF by the following expression (3). The control unit 115 controls the focus driving unit 118 and drives the focus lens 102.

$$M = DEF \times FS \quad (3)$$

In the expression (3), FS represents the sensitivity for converting the defocus amount DEF [mm] into the lens driving amount [lensmm]. The control unit 115 sets the lens driving amount M and causes the focus driving unit 118 to drive the focus lens 102 to the set value in the optical axis direction, thereby providing an image focused on the focus detection position.

The tilt/focus driving amount calculating unit 114 calculates the defocus amount DEF based on the focus detection information obtained by the imaging-plane phase difference detection method, and the focus driving amount and the tilt angle based on the defocus amount DEF. However, while the image sensor 106 is tilted, the correct defocus amount DEF cannot be acquired, or the proper focus driving amount or tilt angle cannot be calculated. Accordingly, the image pickup apparatus 100 according to this embodiment performs the tilt control as follows.

Explanation of Tilt Control

Figure 5A:
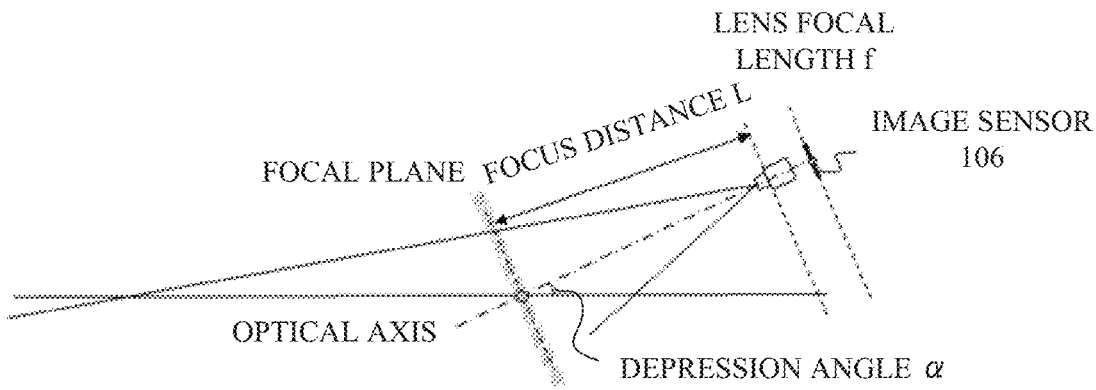
FIGS. 5A to 5C explain a tilt control in each embodiment.
Figure 5B:
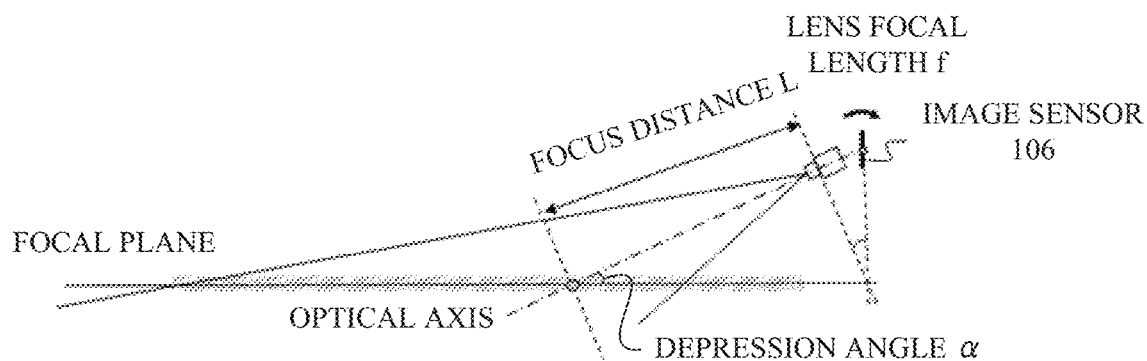

The tilt control will be described with reference to FIGS. 5A to 5C. FIG. 4 is an explanatory diagram of the tilt control. FIG. 5A illustrates that the optical system (imaging optical system) and the image sensor 106 are parallel to each other. A focus distance L is in focus, and the focal plane is parallel to each of the optical system and the image sensor 106. FIG. 5B illustrates that the image sensor 106 is rotated around the image-sensor rotating axis from the state of FIG. 5A and the tilt control is performed. When the tilt control is performed, the focal plane also rotates around the focal-plane rotating axis corresponding to the image-sensor rotating axis based on the Scheimpflug principle. Hence, all objects can be in focused from a short distance to a long distance on a certain plane.

According to the Scheimpflug principle, when the principal plane of the optical system and the imaging plane of the image sensor 106 intersect each other on one certain straight line, the focal plane also intersects the same straight line. A tilt angle b is calculated by the following expression (4) from the Scheimpflug principle using a focal length f, the focus distance L, and a depression angle a.

$$b = \tan^{-1}(f/(L \tan a)) \quad (4)$$

Figure 5C:
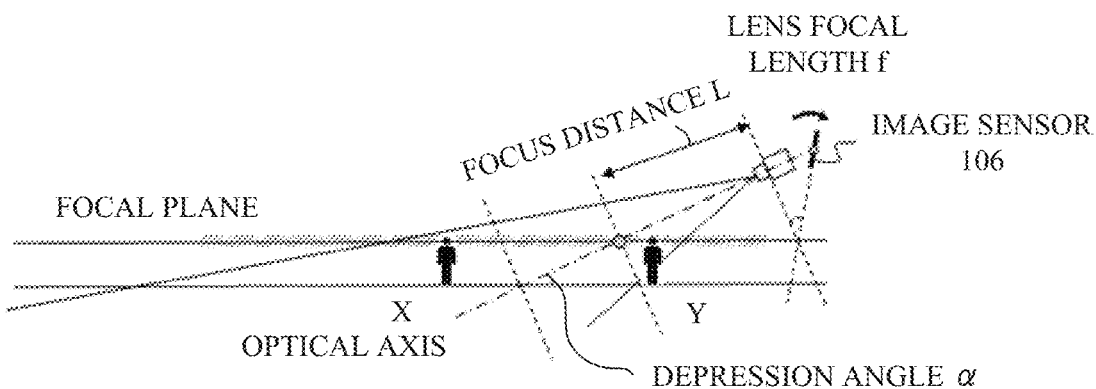

FIG. 5C illustrates a scene having objects X and Y in this case, as illustrated in FIG. 5C, a focal plane may be controlled such that the faces of the objects X and Y are in focus. It is thus necessary to perform the focus control as well as the tilt control. The best focal plane (or the optimum tilt angle and focus position) differs for each object, and the manual adjustment is difficult for the user.

Figure 6:
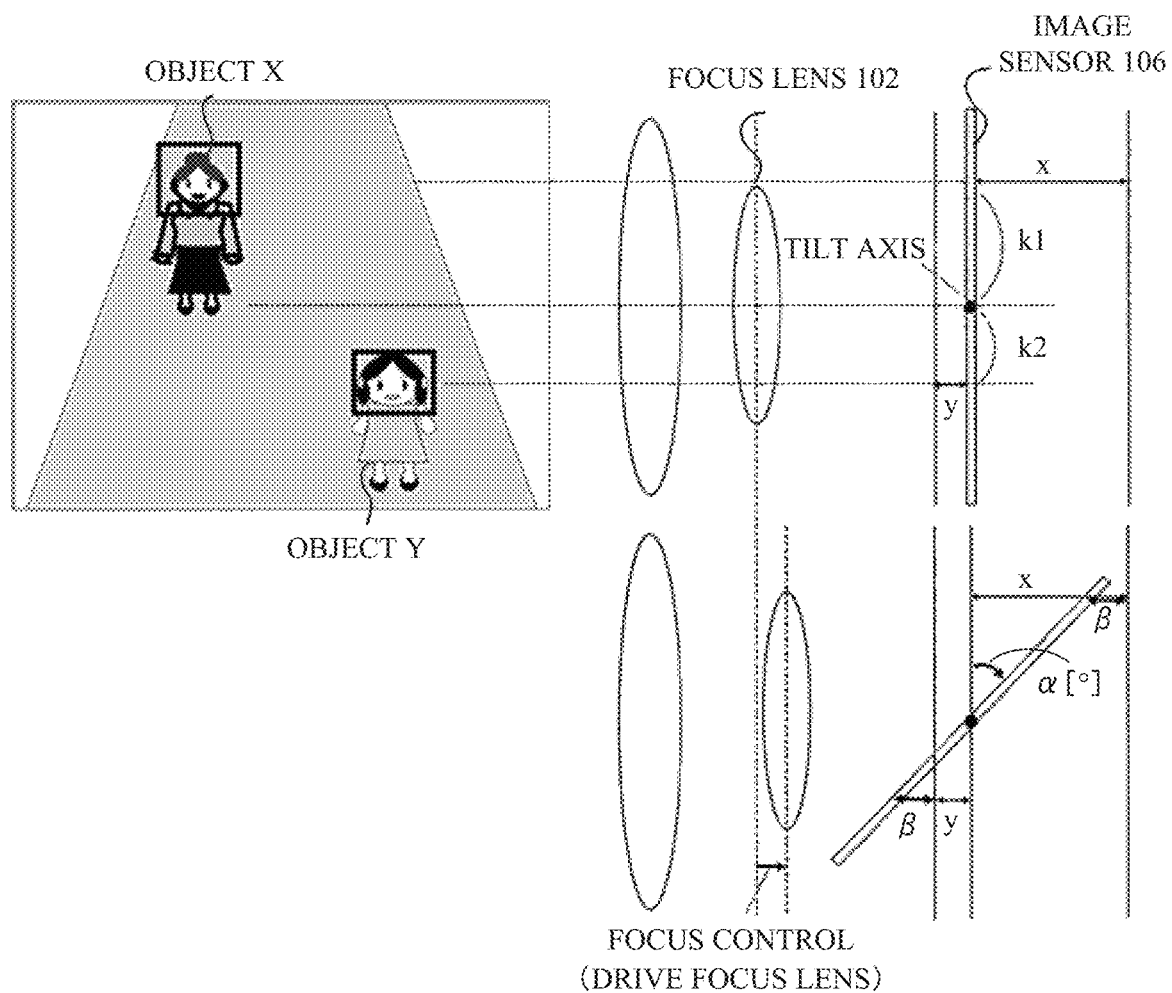
FIG. 6 explains a focus control and a tilt control in each embodiment.

Referring now to FIG. 6, a description will be given of an example of calculating a proper tilt angle and focus position according to the object. FIG. 6 is an explanatory diagram of the tilt control and focus control. Similar to FIG. 5C, the objects X and Y exist as target objects.

The current tilt angle and position of the focus lens 102 are in the positional relationship illustrated in the upper part of FIG. 6. x represents a correction amount on the focal plane necessary for focusing on the object X, and y represents a correction amount on the focal plane necessary for focusing on the object Y. A distance from the tilt axis on the image sensor 106 to the object is k1 [um] for the object X and k2 [um] for the object Y. Here, the following expressions (5) and (6) are established where α[°] is a tilt angle for simultaneous focusing on the objects X and Y and β is a focus correcting amount on the focal plane.

$$x - \beta = k1 \times \tan \alpha + \beta \qquad (5)$$

$$y = k2 \times \tan \alpha - \beta \qquad (6)$$

Solving the simultaneous equation of the expressions (5) and (6), the tilt angle α and the focus correcting amount β are expressed as the following expressions (7) and (8), respectively.

$$\alpha = \tan^{-1}\left(\frac{x+y}{k1+k2}\right) \qquad (7)$$

$$\beta = \left(\frac{k2 \times x - k1 \times y}{k1+k2}\right) \qquad (8)$$

The focus control amount can be simply calculated by dividing the focus correcting amount β by the sensitivity FS of the focus lens 102. On the other hand, the focus control amount can be accurately calculated by solving a high-order expression or a polynomial expression according to the sensitivity FS. However, this embodiment is not limited to this example, and may be calculated by another method.

First Embodiment

Figure 7:
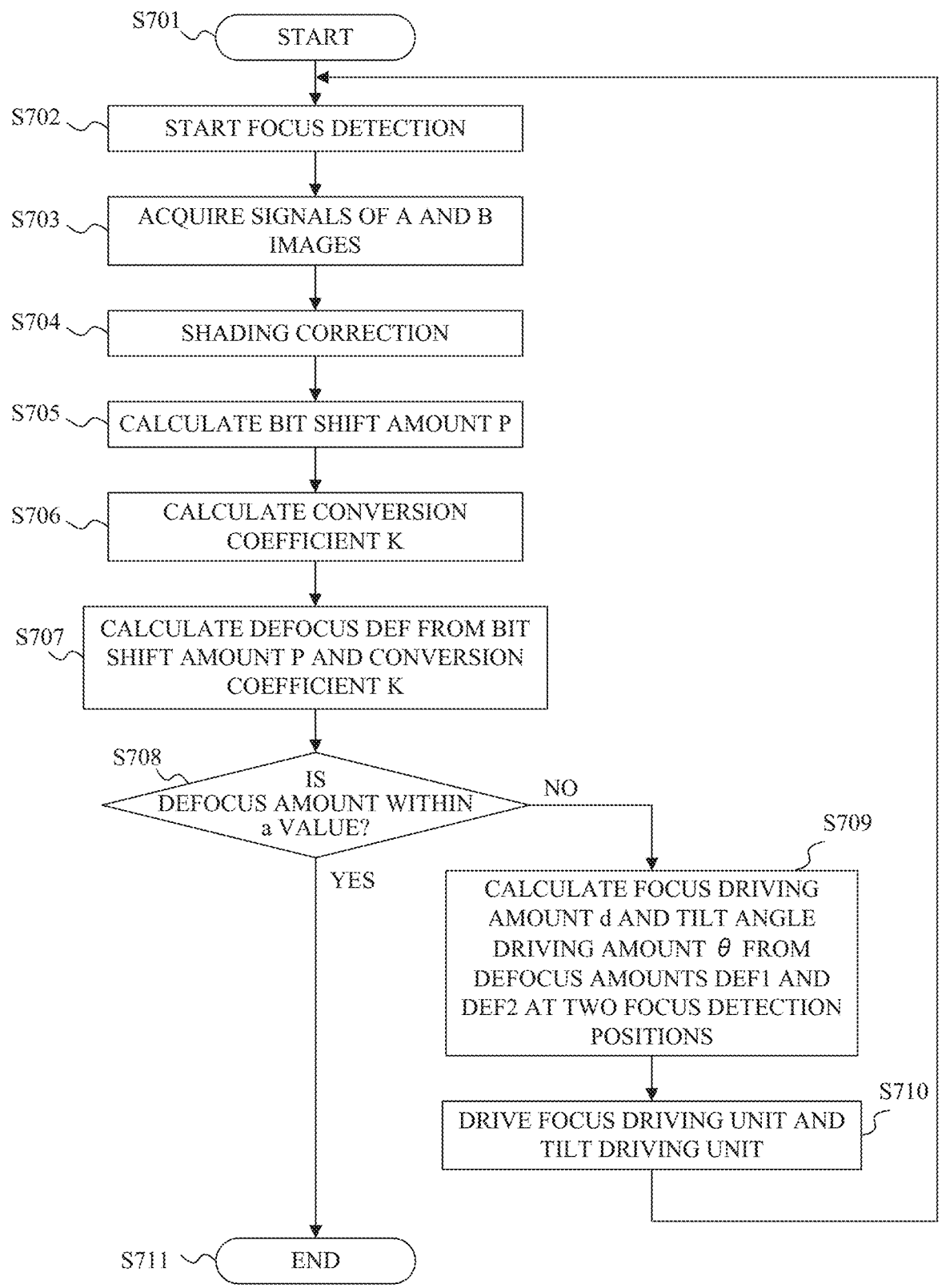
FIG. 7 is a flowchart of a control method according to a first embodiment.

Referring now to FIG. 7, a description will be given of a control method (focus/tilt angle correction processing according to the tilt angle) according to a first embodiment. FIG. 7 is a flowchart of the control method according to this embodiment. Each step in FIG. 7 is mainly executed by the communication unit 110, the focus detection information calculating unit 112, the tilt/focus driving amount calculating unit 114, or the control unit 115.

First, in the step S701, the communication unit 110 sends a focus detection command to control unit 115. Next, in the step S702, the control unit 115 sends a focus detection command to the tilt/focus driving amount calculating unit 114 to start the focus detection. The defocus amount is calculated for two focus detection positions in the steps S702 to S707, but the focus detection calculation will be described at one focus detection position to simplify the description.

Next, in the step S703, the focus detection information calculating unit 112 acquires the A image signal and the B image signal regarding the focus detection position from the image sensor 106. The focus detection position may be either a position determined by the object determination unit 113 as a position where the object exists or a preset position. Next, in the step S704, the focus detection information calculating unit 112 performs shading correction processing (optical correction processing) for each of the A image signal and the B image signal. In the focus detection using the imaging-plane phase difference detection method, the defocus amount is calculated based on the correlation between the A image signal and the B image signal.

Shading due to light shielding may lower the correlation between the A image signal and the B image signal (coincidence degree between signals). Thus, in the focus detection using the imaging-plane phase difference detection method, the shading correction processing (optical correction processing) may be performed in order to improve the correlation (coincidence degree between signals) between the A image signal and the B image signal and the focus detecting performance.

Referring now to FIGS. 8A and 8B, a description will be given of a shading correction of the A image signal and the B image signal. FIGS. 8A and 8B are explanatory diagrams of the shading correction, and sectional views of the imaging optical system. The imaging optical system includes a front lens 801, a diaphragm 802, a rear lens 803, and the front lens 801, the diaphragm 802, and the rear lens 803 indicate the light beam diameter at each position. When the focus detection position is the center c of the image sensor 106, the exit pupil is substantially evenly divided by the partial pupil area of the A image and the partial pupil area of the B image. On the other hand, as illustrated in FIG. 8B, when the image sensor 106 is tilted and a focus detection position h is a peripheral image height of the image sensor 106, a light amount is limited by light shielding of the imaging optical system, and the exit pupil is unevenly divided. Thus, there occurs a phenomenon called shading that causes an intensity difference between the A image signal and the B image signal, resulting in a poor balance.

Next, in the step S704 of FIG. 7, the focus detection information calculating unit 112 performs shading correction processing (optical correction processing). First, a first shading correction coefficient of the A image signal and a second shading correction coefficient of the B image signal (first correction amount and second correction amount) are determined based on at least one of the image height at the focus detection position, the optical information of the imaging optical system, and the tilt angle of the image sensor 106. The optical information is acquired by the control unit 115, for example. In this case, the control unit 115 is an acquisition unit that acquires optical information.

The memory 120 stores data relating to the shading correction coefficient in a table as illustrated in FIGS. 9A and 9B. However, the present invention is not limited to this example, and may be obtained by a calculation. FIGS. 9A and 9B are data tables relating to shading correction coefficients. In FIGS. 9A and 9B, the shading correction coefficient is determined based on the focus position, the image height at the focus detection position, and the tilt angle, but FIGS. 9A and 9B are merely illustrative and the table producing method may be another method. When the tilt angle is large, the light shielding influence becomes strong and the shading correction coefficient (correction amount) becomes large. In other words, when the tilt angle is a first tilt angle, the correction amount is the first correction amount, and when the tilt angle is a second tilt angle larger than the first tilt angle, the correction amount is the second correction amount larger than the first correction amount.

Next, the focus detection information calculating unit 112 multiplies the A image signal by the shading correction coefficient of the A image (first shading correction coefficient) and the B image signal by the shading correction coefficient of the B image (second shading correction coefficient). Then, the intensities of the A image signal and the B image signal are made similar to each other, and the shading correction processing (optical correction processing) is ended. In this embodiment, the optical information of the imaging optical system includes at least one of the focus position, the zoom position, and the aperture value (F-number), but is not limited to them.

Next, in the step S705 in FIG. 7, the focus detection information calculating unit 112 calculates the bit shift amount P based on the correlation amount between the A image signal and the B image signal. Next, in the step S706, the focus detection information calculating unit 112 calculates a conversion coefficient K based on the optical information of the imaging optical system and the tilt angle of the image sensor 106.

FIGS. 10A and 10B are explanatory diagrams of the correction of the conversion coefficient K, and illustrate the exit pupil 1001 by the partial pupil area of the A image and the partial pupil area of the B image of the pixel (focus detecting pixel) 201 at the center position c of the image sensor 106. FIG. 10A illustrates that the image sensor 106 is tilted, and FIG. 10B illustrates that the image sensor 106 is tilted. In FIG. 10B, as compared with FIG. 10A, the shape of the exit pupil 1001 changes because the image sensor 106 is tilted. Due to the shape change of the exit pupil 1001, the intensities of the A image signal and the B image signal are similar to each other. However, in the state in which the image sensor 106 is tilted, the center of gravity position of light changes as compared to the state in which the image sensor 106 is not tilted, and the bit shift amount P changes even with the same defocus amount. This is because the baseline length becomes pseudo long by tilting the image sensor 106. Due to this phenomenon, an accurate defocus amount cannot be calculated, and thus the conversion coefficient K may be changed according to the tilt angle of the image sensor 106.

FIGS. 11A and 11B are data tables regarding the conversion coefficient K. Data relating to the conversion coefficient K is stored in the memory 120 in a table as illustrated in FIGS. 11A and 11B. However, the present invention is not limited to this example, and may be obtained by the calculation. In FIGS. 11A and 11B, the conversion coefficient K is determined based on the focus position, the image height at the focus position, and the tilt angle, but FIGS. 11A and 11B are merely illustrative and the data producing method may be another method.

In obtaining the conversion coefficient K by the calculation, the conversion coefficient K can be expressed by the following expression (9) using the tilt angle α.

$$K = (Zep/BL) \times \cos \alpha \quad (9)$$

However, the expression (9) is merely an example of calculating the conversion coefficient K, and the conversion coefficient K may be calculated using another method. When the tilt angle α is large, the conversion coefficient K becomes small as expressed by the expression (9). That is, when the tilt angle is a third tilt angle, the conversion coefficient is the first conversion coefficient, and when the tilt angle is a fourth tilt angle larger than the third tilt angle, the conversion coefficient is the second conversion coefficient smaller than the first conversion coefficient.

Next, in the step S707 of FIG. 7, the focus detection information calculating unit 112 calculates the defocus amount DEF based on the bit shift amount P and the conversion coefficient K. Next, in the step S708, the focus detection information calculating unit 112 executes the steps S702 to S707, and determines whether or not the defocus amounts DEF1 and DEF2 at two calculated, focus detection positions are within the a value (predetermined range). Here, the a value may be set to ±Fδ which is the depth of field. When the defocus amounts DEF1 and DEF2 are not within the a value in the step S708, the flow proceeds to the step S709.

In the step S709, the tilt/focus driving amount calculating unit 114 calculates the focus driving amount d and the tilt angle drive amount θ based on the defocus amounts DEF1 and DEF2 calculated by the focus detection information calculating unit 112. Next, in the step S710, the control unit 115 controls the focus driving unit 118 and the image sensor driving unit 116 according to the focus driving amount d and the tilt angle drive amount θ calculated by the tilt/focus driving amount calculating unit 114 in the step S708. Then, returning to the step S702, the control unit 115 performs the focus detection. The timing of returning from the step S710 to the step S702 may be either after the focus and tilt driving or during the focus and tilt driving. The contrast value etc. may not be acquired during the focus and tilt driving. Therefore, the focus driving unit 118 that drives the focus lens 102 and the image sensor driving unit 116 that drives the image sensor 106 can simultaneously drive the focus lens 102 and the image sensor 106. Therefore, a focus control and tilt angle correction can be made faster than ever.

If the defocus amounts DEF1 and DEF2 are within the a value in the step S708, the control unit 115 determines the in-focus state, and ends this flow (focus/tilt angle correction control program).

This embodiment can accurately perform a focus detection by the imaging-plane phase difference detection method and quickly calculate the tilt angle and the focus detection even when the imaging plane is tilted, and improve the accuracy and quality.

Second Embodiment

Figure 12:
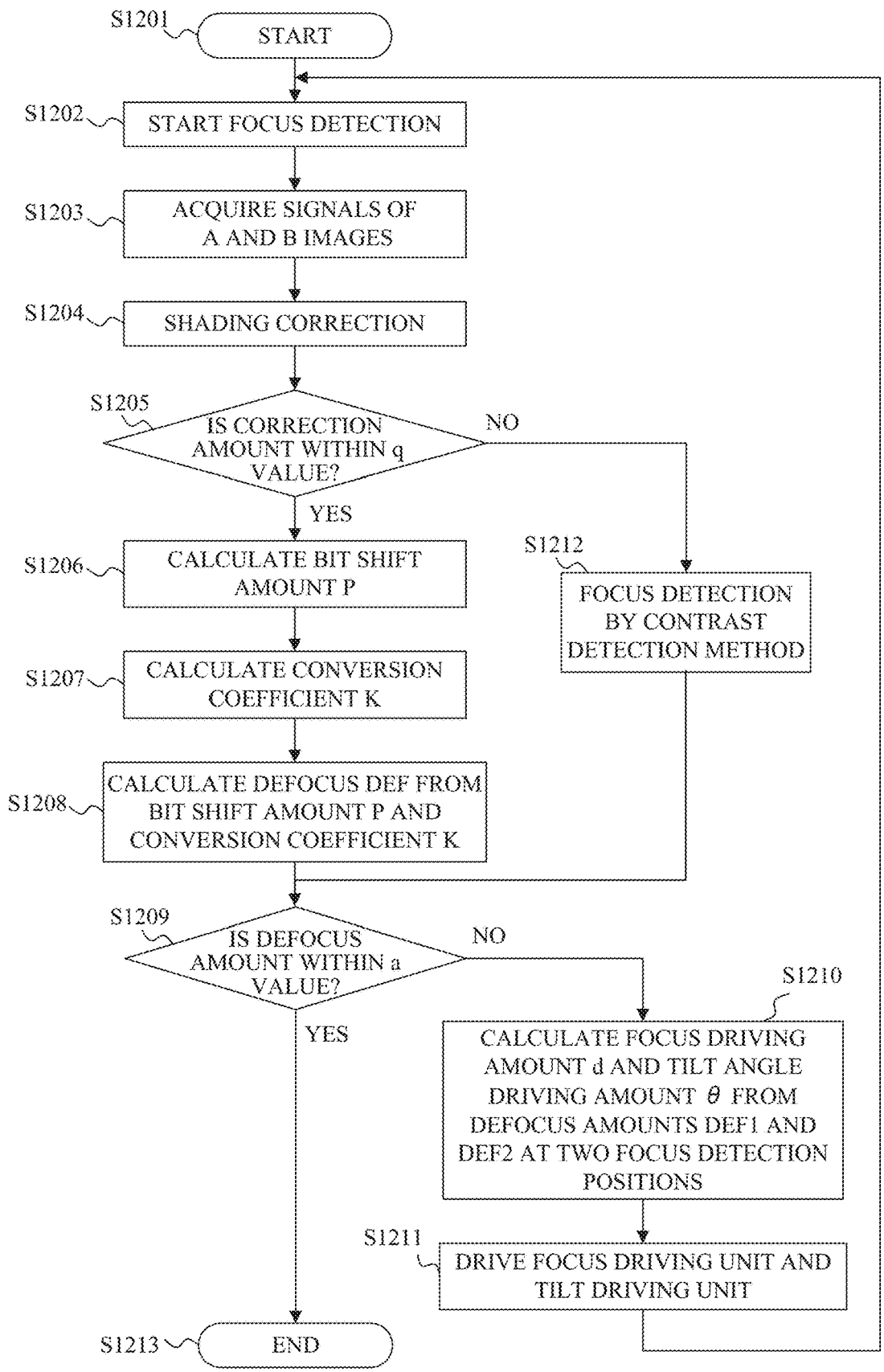
FIG. 12 is a flowchart of a control method according to a second embodiment.

Referring now to FIG. 12, a description will be given of a control method (focusing and tilt angle correction processing according to the tilt angle) according to a second embodiment. FIG. 12 is a flowchart of the control method according to this embodiment. Each step in FIG. 12 is mainly executed by the communication unit 110, the focus detection information calculating unit 112, the tilt/focus driving amount calculating unit 114, or the control unit 115.

This embodiment is different from the first embodiment (FIG. 7) in that the focus detection method is changed based on the correction amount (the steps S1205 and S1212 are inserted into FIG. 12). Other configurations and methods in this embodiment are the same as those in the first embodiment, and therefore a description thereof will be omitted.

In the step S1204, the focus detection information calculating unit 112 determines a correction amount (shading correction coefficient) during the shading correction. Next, in the step S1205, the focus detection information calculating unit 112 determines whether or not the correction amount is within a q value (smaller than a predetermined correction amount). When the tilt angle of the image sensor 106 is large and the focus detection position is at a high image height, the intensity balance of the A image signal and the B image signal is poor, or when the intensity is low due to the light shielding influence, the correction amount becomes too large and the accurate correction may not be available. If the accurate correction is unavailable, the focus detecting accuracy deteriorates and an accurate focus position and tilt angle cannot be calculated. Hence, in this embodiment, if the correction amount is not within the q value in the step S1205 (the correction amount is larger than the predetermined correction amount), the focus detection method is changed in the step S1212. That is, in the step S1212, the focus detection information calculating unit 112 calculates the defocus amounts DEF1 and DEF2 by the contrast detection method similar to the conventional one instead of the phase difference detection method.

Thus, in this embodiment, the focus detection information calculating unit 112 calculates the defocus amount by the phase difference detection method when the correction amount is smaller than the predetermined correction amount, and calculates the defocus amount by the contrast detection method when the correction amount is larger than the predetermined correction amount.

This embodiment performs a combination of the focus detection of the phase difference detection method and the focus detection of the contrast detection method. Thereby, in comparison with a case where the focus detection is performed only by the conventional contrast detection method, the distance is detected by the phase difference detection method until the correction amount is equal to or smaller than the q value, and the focus and the tilt angle are corrected faster than ever. Further, even when the tilt angle is large and the focus detection position is at a high image height, the focus and tilt angle can be properly corrected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can perform a highly accurate focus detection even when the imaging plane is tilted, and a high-speed, highly accurate, and high-quality tilt angle control and focus position correction control. Thus, each embodiment can provide a control apparatus, a control method, and a storage medium, each of which can provide a high-speed and highly accurate focus control even when the imaging plane is tilted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204902, filed on Nov. 12, 2019 which is hereby incorporated by reference herein in its entirety.

What is claimed is:

1. A control apparatus comprising:
    an acquisition unit configured to acquire optical information;
    a tilt control unit configured to tilt an image sensor relative to a plane orthogonal to an optical axis of an imaging optical system; and
    a calculation unit configured to calculate an image shift amount by a phase difference detection method based on a signal from the image sensor and to calculate a defocus amount based on the image shift amount and a conversion coefficient,
    wherein the calculation unit changes the conversion coefficient based on the optical information and a tilt angle that is an angle formed by the image sensor and the plane, and
    wherein at least one processor or circuit is configured to perform a function the units.

2. The control apparatus according to claim 1, wherein the optical information includes at least one of a focus position, a zoom position, and an F-number.

3. The control apparatus according to claim 1, wherein the calculation unit changes a correction amount of the signal for determining the image shift amount based on the optical information and the tilt angle, and
    wherein the control apparatus further comprises a memory configured to store data relating to the correction amount.

4. The control apparatus according to claim 3, wherein when the tilt angle is a first tilt angle, the correction amount is a first correction amount, and when the tilt angle is a second tilt angle larger than the first tilt angle, the correction amount is a second correction amount larger than the first correction amount.

5. The control apparatus according to claim 1, further comprising a memory configured to store data relating to the conversion coefficient.

6. The control apparatus according to claim 4, wherein when the tilt angle is a third tilt angle, the conversion coefficient is a first conversion coefficient, and when the tilt angle is a fourth tilt angle larger than the third tilt angle, the conversion coefficient is a second conversion coefficient smaller than the first conversion coefficient.

7. The control apparatus according to claim 3, wherein the calculation unit changes a focus detection method based on the correction amount.

8. The control apparatus according to claim 7, wherein the calculation unit calculates the defocus amount by the phase difference detection method when the correction amount is smaller than a predetermined correction amount, and calculates the defocus amount by a contrast detection method when the correction amount is larger than the predetermined correction amount.

9. The control apparatus according to claim 1, further comprising:
    a driving amount control unit configured to calculate a focus driving amount based on the defocus amount; and
    a focus control unit configured to perform a focus control based on the focus driving amount.

10. The control apparatus according to claim 9, wherein the focus control unit performs the focus control by driving a focus lens.

11. The control apparatus according to claim 10, wherein the focus control unit and the tilt control unit simultaneously drive the focus lens and the image sensor.

12. The control apparatus according to claim 3, wherein the correction amount corresponds to a shading correction coefficient.

13. The control apparatus according to claim 1, further comprising an image sensor.

14. A control method comprising the steps of:
acquiring optical information;
tilting an image sensor relative to a plane orthogonal to an optical axis of an imaging optical system; and
calculating an image shift amount by a phase difference detection method based on a signal from the image sensor and to calculate a defocus amount based on the image shift amount and a conversion coefficient,
wherein the calculation step changes the conversion coefficient based on the optical information and a tilt angle that is an angle formed by the image sensor and the plane.

15. A non-transitory computer-readable storage medium storing a program for causing a computer to execute the control method according to claim 14.

16. The control apparatus according to claim 1, wherein the calculation unit calculates the image shift amount by the phase difference detection method based on the signal from the image sensor without using an AF sensor.

17. The control apparatus according to claim 1, wherein the conversion coefficient is changed according to an image height.

* * * * *